US012340673B1

(12) United States Patent
Desai et al.

(10) Patent No.: US 12,340,673 B1
(45) Date of Patent: Jun. 24, 2025

(54) FALL MONITOR SYSTEM (71) Applicant: DeRoyal Industries, Inc., Powell, TN (US)

(72) Inventors: Dhanvin S. Desai, Knoxville, TN (US); Ethan Valentine, Knoxville, TN (US); Walter C. Cowart, Blaine, TN (US); Sarah O. Davis, Knoxville, TN (US); Evan Reese, Nashville, TN (US); Nick Sinas, Franklin, TN (US); Troy Cayon, Nashville, TN (US); Anthony Ford, Hendersonville, TN (US)

(73) Assignee: DeRoyal Industries, Inc., Powell, TN (US)

( * ) Notice: Subject to any disclaimer, the term of this patent is extended or adjusted under 35 U.S.C. 154(b) by 0 days.

(21) Appl. No.: 18/198,113

(22) Filed: May 16, 2023

Related U.S. Application Data (60) Provisional application No. 63/342,268, filed on May 16, 2022.

(51) Int. Cl.
*G08B 21/22* (2006.01)
*G08B 21/04* (2006.01)
*H04W 4/80* (2018.01)

(52) U.S. Cl.
CPC .......... *G08B 21/043* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 6,078,261 | A | 6/2000 | Davsko |
| 6,847,301 | B1 | 1/2005 | Olson |
| 7,474,224 | B2 | 1/2009 | Long et al. |
| 7,557,719 | B1 | 7/2009 | Long |
| 7,714,728 | B2 | 5/2010 | Koblasz |
| 7,924,163 | B1 | 4/2011 | Long et al. |
| 8,085,154 | B2 | 12/2011 | Williams et al. |
| 9,173,992 | B2 | 11/2015 | Bengtsson et al. |
| 9,253,891 | B2 | 2/2016 | Williams |
| 9,466,204 | B2 | 10/2016 | Olson |

(Continued)

FOREIGN PATENT DOCUMENTS

WO  2009104131 A1  8/2009

*Primary Examiner* — John F Mortell
(74) *Attorney, Agent, or Firm* — Luedeka Neely, P.C.

(57) ABSTRACT

A fall monitor has a first wireless communications receiver and a second wireless communications receiver. The second receiver receives wireless communications according to a different communications protocol than the first receiver. A fall detection pad includes a wireless communications module having a first pad transmitter configured to communicate with the first receiver to transmit a pairing communication when the fall detection pad is placed in proximity to the first receiver and a second pad transmitter configured to communicate with the second receiver when the fall detection pad is paired with the fall monitor display unit to transmit the fall alarm communication when the fall detection pad determines that a patient has removed pressure from the fall detection pad. A clinician key may be provided that is configured to communicate with the first receiver to provide a hold status for the alarm signal of the display unit.

20 Claims, 3 Drawing Sheets

(56) References Cited

U.S. PATENT DOCUMENTS

| | | | |
|---|---|---|---|
| 10,064,052 | B2 | 8/2018 | Peluso et al. |
| 10,470,689 | B2 | 11/2019 | Kilcran et al. |
| 10,499,834 | B2 | 12/2019 | Eddy |
| 10,674,940 | B2 | 6/2020 | Kilcran et al. |
| 10,692,346 | B2 | 6/2020 | Carr et al. |
| 10,799,153 | B2 | 10/2020 | Kilcran et al. |
| 2010/0163315 | A1 | 7/2010 | York et al. |
| 2011/0028091 | A1 | 2/2011 | Higgins et al. |
| 2014/0232556 | A1 | 8/2014 | Williams |
| 2015/0039794 | A1 | 2/2015 | Williams |
| 2015/0305620 | A1 | 10/2015 | Williams et al. |
| 2017/0209076 | A1 | 7/2017 | Williams |
| 2019/0051137 | A1* | 2/2019 | Kilcran ................ A61B 5/1115 |
| 2020/0320843 | A1 | 10/2020 | Carr et al. |
| 2024/0074677 | A1 | 3/2024 | Thomas et al. |

\* cited by examiner

FALL MONITOR SYSTEM

CROSS REFERENCE TO RELATED APPLICATION

This application claims priority to U.S. Provisional Application Ser. No. 63/342,268 filed May 16, 2022, entitled "Fall Monitor System," the entire contents of which is incorporated herein by reference.

FIELD

This disclosure relates to the field of fall monitor systems. More particularly, this disclosure relates to a fall monitor system having an improved monitor display unit with improved functionality.

BACKGROUND

Fall monitor systems generally include a pressure detection pad electrically connected to a fall monitor. Current pressure detection pads generally include five layers: (1) top PVC outer film layer; (2) a first mylar sheet with a conductive ink pattern; (3) a polyurethane foam deflecting barrier; (4) a second mylar sheet with a conductive ink pattern; and (5) a bottom PVC outer film layer. The pad is operable to communicate with the monitor in either a wireless or wired connection as known in the art.

In operation, the pressure detection pad is placed underneath the intended position of a patient (such as a bed or wheel chair). When weight is applied to the pad, a circuit is completed between the conductive ink patterns of the first and second mylar sheets through the polyurethane foam layer. Completion of the circuit generates a signal that is sent to the fall monitor. When the circuit is broken (i.e., a patient has fallen or otherwise shifted weight completely off the pad), an alarm is generated at the fall monitor.

Issues with current fall monitor systems include difficulty and/or complexity in pairing a fall detection pad to a fall monitor for wireless systems. Additionally, many current monitors are limited in that they may only communicate with a fall detection pad in a wired connection or a wireless connection. Another problem with many fall monitors is that the monitors are designed such that a caregiver, patient, or other visitor in a patient room may activate a "hold" or "suspend" mode of the monitor unintentionally.

What is needed therefore is an improved fall monitor system that addresses the above and other problems with existing designs.

SUMMARY

The above and other needs are met by a fall monitor system including a fall monitor display unit and a fall detection pad. The fall monitor display unit is configured to generate a fall alarm signal in response to a fall alarm communication. The fall monitor display unit includes a first wireless communications receiver and a second wireless communications receiver configured to receive wireless communications according to a different communications protocol than the first wireless communications receiver. The fall detection pad is configured to generate the fall alarm communication when the fall detection pad determines that a patient has removed pressure from the fall detection pad. The fall detection pad includes a wireless communications module having a first pad transmitter configured to communicate with the first wireless communications receiver to transmit a pairing communication when the fall detection pad is placed in proximity to the first wireless communications receiver to pair the fall detection pad to the fall monitor display unit and a second pad transmitter configured to communicate with the second wireless communications receiver when the fall detection pad is paired with the fall monitor display unit to transmit the fall alarm communication when the fall detection pad determines that a patient has removed pressure from the fall detection pad.

According to certain embodiments, the fall monitor display unit further includes a clinician key section, the first wireless communications receiver is disposed adjacent the clinician key section, and the first wireless communications receiver is configured to receive wireless communications from a corresponding clinician key to disable generation of the fall alarm signal when the clinician key is placed in proximity to the clinician key section.

According to some embodiments, the first wireless communications receiver is an RFID reader and the corresponding clinician key includes an RFID tag such that, when the clinician key is placed in proximity of the clinician key section, the RFID tag is operable to transmit an identifier to the RFID reader to disable generation of the fall alarm signal. According to some embodiments, the RFID tag of the clinician key is a passive RFID tag. According to some embodiments, the first pad transmitter of the fall detection pad includes an RFID tag that is operable to transmit a pad identifier to the RFID reader of the clinician key section, the second wireless communications receiver of the fall monitor display unit includes a Bluetooth receiver, and the second pad transmitter of the fall detection pad includes a Bluetooth transmitter for communicating with the Bluetooth receiver.

According to certain embodiments, the fall monitor display unit is configured to disable generation of the fall alarm signal when the clinician key is placed in proximity to the clinician key section for at least one of a predetermined time period and the fall monitor display unit determines that the patient has returned to the fall detection pad.

According to certain embodiments, the first wireless communications receiver includes a low power state for conserving power while detecting for the presence of the clinician key in proximity to the clinician key section and an increased power state for communicating with the clinician key when the presence of the clinician key is detected.

According to certain embodiments, the second wireless communications receiver is configured to receive wireless communications according to a longer range communications protocol than the first wireless communications receiver.

According to certain embodiments, the fall monitor system further includes a reusable cord configured to be connected at a first end to the fall monitor display unit and to a second fall detection pad at a second end to provide a wired connection between the fall monitor display unit and the second fall detection pad.

According to another embodiment of the disclosure, a fall monitor display unit configured to generate a fall alarm signal in response to a fall alarm communication. The display unit includes a clinician key section having a first wireless communications receiver configured to receive a wireless pairing communication from a first transmitter of a wireless communications module of a fall detection pad when the fall detection pad is placed in proximity to the clinician key section to pair the fall detection pad to the fall monitor display unit and configured to receive a wireless disable communication from a clinician key to disable generation of the fall alarm signal when the clinician key is placed in proximity to the clinician key section. The display unit further includes a second wireless communications receiver configured to receive wireless communications from a second transmitter of the wireless communications module of the fall detection pad after the fall detection pad is paired to the fall monitor display unit.

According to certain embodiments, the first wireless communications receiver is an RFID reader configured to receive an identifier from an RFID tag of the clinician key to disable generation of the fall alarm signal when the clinician key is placed in proximity of the clinician key section. In some embodiments, the RFID reader is configured to activate a passive RFID tag of the clinician key. In some embodiments, the second wireless communications receiver of the fall monitor display unit includes a Bluetooth receiver.

According to certain embodiments, the fall monitor display unit is configured to disable generation of the fall alarm signal when the clinician key is placed in proximity to the clinician key section for a predetermined time period. In some embodiments, the fall monitor display unit is configured to return to a monitoring status within the predetermined time period when the fall monitor display unit determines that a patient has reapplied pressure to the fall detection pad.

According to certain embodiments, the second wireless communications receiver is configured to receive wireless communications according to a different protocol than the first wireless communications receiver.

According to certain embodiments, the second wireless communications receiver is configured to receive wireless communications according to a longer range communications protocol than the first wireless communications receiver.

According to certain embodiments, the first wireless communications receiver includes a low power state for conserving power while detecting for the presence of the clinician key in proximity to the clinician key section and an increased power state for communicating with the clinician key when the presence of the clinician key is detected.

According to another embodiment of the disclosure, a fall monitor display unit configured to generate a fall alarm signal in response to a fall alarm communication includes a clinician key section and an RFID reader disposed adjacent the clinician key section. The RFID reader is configured to receive wireless communication from a corresponding RFID tag of clinician key to disable generation of the fall alarm signal when the clinician key is placed in proximity to the clinician key section.

According to yet another embodiment of the disclosure, a method for monitoring a patient for a fall includes providing a fall monitor display unit configured to generate a fall alarm signal in response to a fall alarm communication, the fall monitor display having a first wireless communications receiver and a second wireless communications receiver; providing a fall detection pad having a pressure detection circuit and a wireless communications module, the wireless communications module including a first pad transmitter configured to communicate with the first wireless communications receiver and a second pad transmitter configured to communicate with the second wireless communications receiver; pairing the fall detection pad to the fall monitor display unit by positioning the wireless communications module in proximity to the first wireless communications receiver such that the first pad transmitter transmits a pairing communication to the first wireless communications receiver; positioning the fall detection pad underneath a patient such that pressure from the patient completes the pressure detection circuit; generating the fall alarm communication when the fall detection pad determines that pressure detection circuit is broken; transmitting the fall alarm communication from the second pad transmitter to the second wireless communications receiver of the fall monitor display unit; and generating the fall alarm signal at the fall monitor display unit upon receipt of the fall alarm communication from the fall detection pad.

According to certain embodiments, the method further includes providing a clinician key having a key transmitter configured to communicate with the first wireless communications receiver to disable generation of the fall alarm signal when the clinician key is placed in proximity to the clinician key section.

BRIEF DESCRIPTION OF THE DRAWINGS

Other embodiments of the disclosure will become apparent by reference to the detailed description in conjunction with the figures, wherein elements may not be to scale so as to more clearly show the details, wherein like reference numbers indicate like elements throughout the several views, and wherein.

DETAILED DESCRIPTION

Figure 1:
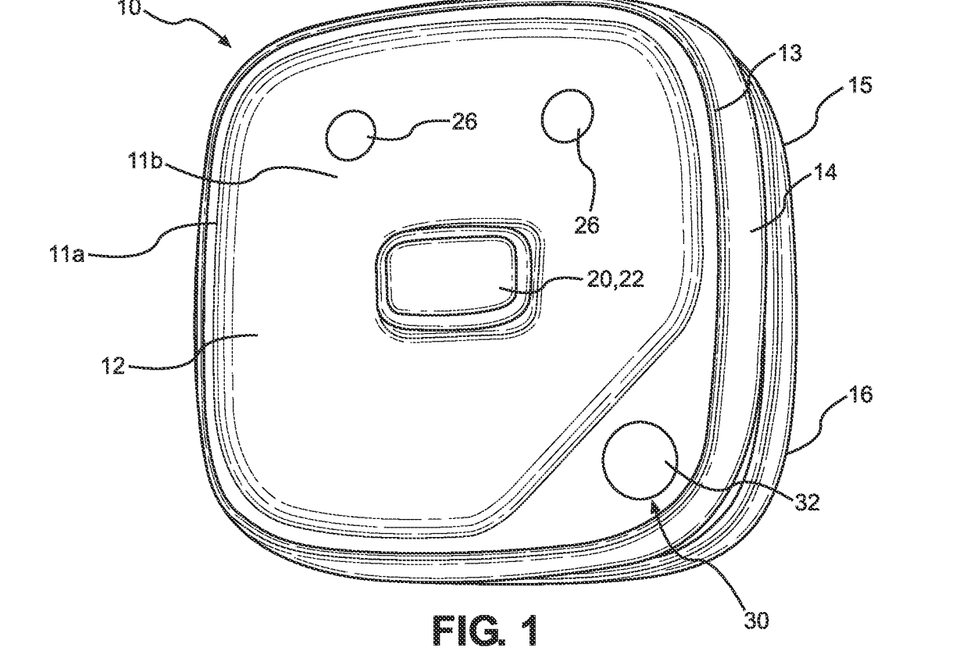
FIG. 1 depicts a front perspective view of a fall monitor according to one embodiment of the disclosure.

Referring to FIG. 1, a fall monitor display unit 10 according to one embodiment of the disclosure is depicted. The fall monitor 10 includes a front surface 12, a rear surface 16, and an outer sidewall 14 connecting the front surface 12 at a front end 13 to the rear surface 16 at a rear end 15. As depicted, the front surface 12 includes an interior sidewall 11a leading to a planar wall 11b such that the planar wall 11b is recessed with respect to the front end 13 of sidewall 14. One or more buttons 20 are disposed on the planar wall 11b of front surface 12. The one or more buttons 20, such as a reset button, include a front activation surface 22 having an unactivated position in which the surface 22 is positioned a distance from the planar wall 11b of the front surface 12 that is substantially the same or less than a distance in which the front end 13 of sidewall 14 extends from the planar wall 11b. As a result, if the monitor 10 is dropped face down, the front end 13 of sidewall 14 will prevent the one or more buttons 20 from being pressed/activated unintentionally.

With continued reference to FIG. 1, the planar wall 11b of front surface 12 of the fall monitor 10 further includes one or more lights 26 (e.g., LED lights). The monitor 10 is configured to flash/activate the lights 26 in various colors depending on the operating state of the fall monitor system, the patient status, and/or to issue alarms based on changes in the patient status or changes in the operating state of the fall monitor system. The planar wall 11b of front surface 12 being disposed inward with respect to the front end 13 of sidewall 14 as explained above provides a surface (i.e., interior sidewall 11a of front surface 12) for the LED light to reflect to make the light appear larger and/or more noticeable.

It should be understood that many other configurations and appearances of the fall monitor display unit 10 are possible and within the scope of the disclosure. For example, the interior sidewall 11a could be curved as shown or replaced with a portion that extends inward in a straight fashion (or the degree of curve could be altered), the sidewall 14 could be circular instead of square with rounded corners, the size and shape of the planar wall 11b could be altered, etc.

Figure 2:
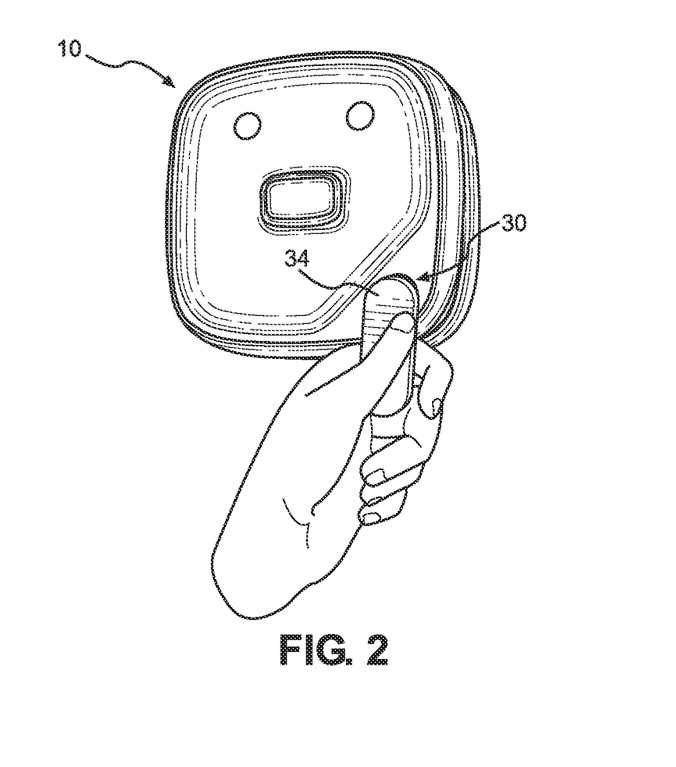
FIG. 2 depicts the front perspective view of the fall monitor of FIG. 1 with a clinician key being placed in proximity to a clinician key section of the fall monitor according to one embodiment of the disclosure.

With reference to FIG. 2, and according to another aspect of the disclosure, the fall monitor display unit 10 further includes a clinician key section 30 having an activation surface 32. The activation surface 32 is preferably a "raised" corner portion that is generally aligned with the front end 13 of the sidewall 14 (i.e., raised with respect to planar wall 11b). However, the activation surface 32 could also be disposed on the planar wall 11b or even incorporated into the sidewall 14. The clinician key section 30 incorporates a first wireless communications receiver preferably utilizing a short-range, low power wireless communication protocol such as RFID, Bluetooth, Wi-Fi, Zigbee, etc. The first receiver is operable to communicate with a wireless transmitter incorporated into a corresponding key 34. In operation, the clinician key section 30 is operable to activate a particular function of the monitor display 10 when a clinician places the corresponding key 34 in proximity to the activation surface 32. While the particular functions may vary, the clinician key section 30 preferably activates a hold/suspend status for a fall alarm signal generated by the monitor when a clinician places a corresponding key 34 in proximity to the activation surface 32 as further described below.

Figure 5:
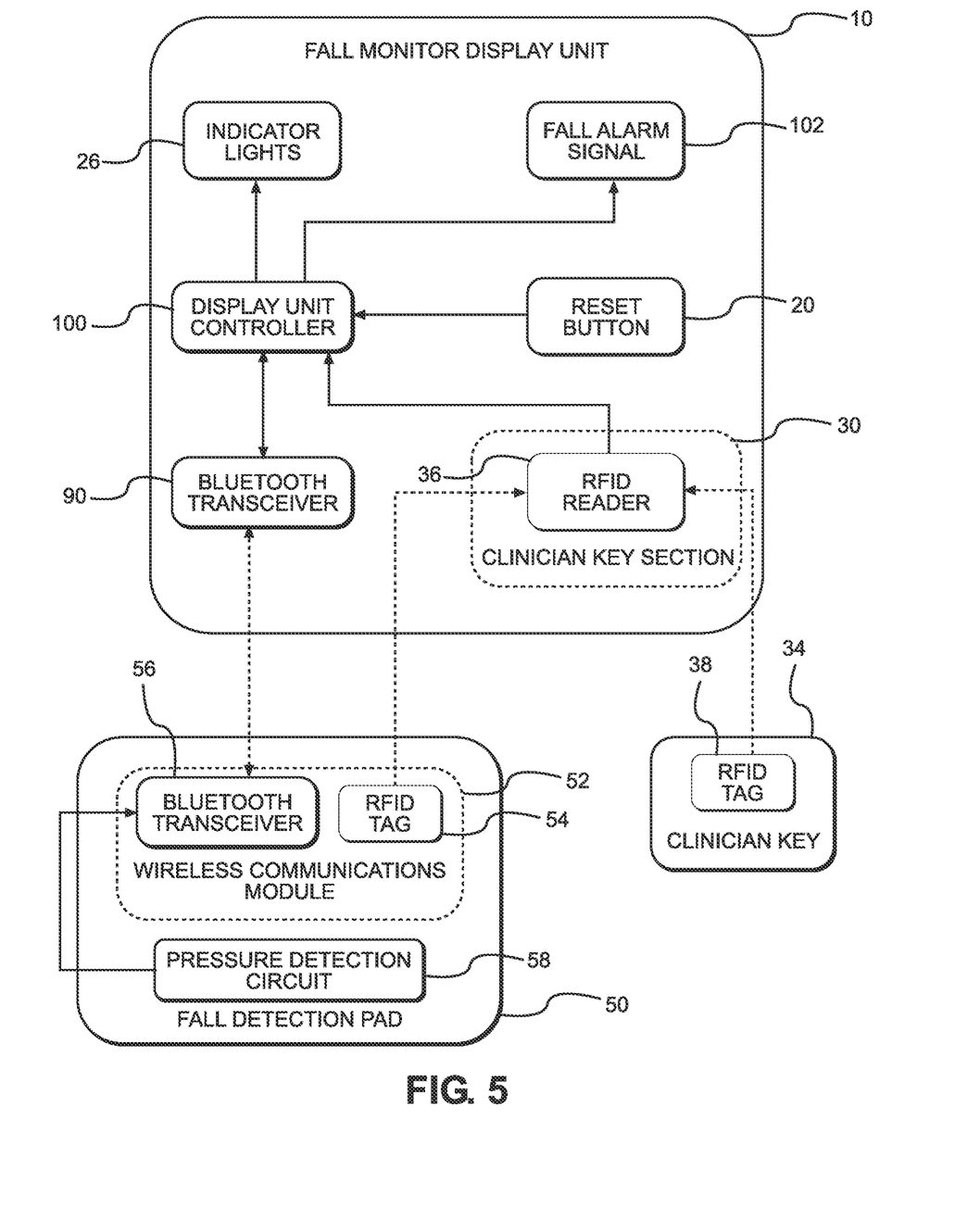
FIG. 5 depicts a block circuit diagram of a fall monitor system according to one embodiment of the disclosure.

With reference to the simplified block circuit diagram of FIG. 5 (referred to as "simplified" as certain understood components of the wireless communication systems referenced have been omitted for simplicity), the receiver 36 of the clinician key section 30 is preferably an RFID reader and the transmitter 38 of the key 34 is a corresponding RFID tag. In certain embodiments, the key 34 includes a passive RFID tag that is activated by the RFID reader when placed in proximity to the clinician key section 30. Whether passive or active, when placed in proximity of the clinician key section 30, the key 34 is operable to transmit an identifier to the RFID reader 36 that ultimately provides instruction to the controller 100 of the monitor display unit 10 to disable or otherwise suspend the fall alarm signal 102 according to certain predetermined parameters. For example, the monitor 10 may be instructed to disable the fall alarm signal 102 for a predetermined period of time to give a caregiver sufficient time to move or otherwise provide certain care to the patient without activation of the alarm signal 102. In other embodiments, the parameters may be defined by the controller 100 such that the fall alarm signal 102 is disabled until the pressure detection pad 50 detects pressure being reapplied to the pad (i.e., the fall alarm signal 102 is disabled upon the key 34 being placed in proximity to the clinician key section 30 and then monitoring is reactivated once the controller 100 determines first that the patient is removed from the pad 50 and then second that the patient has returned to the patient's position on the pad 50).

In certain embodiments, the monitor 10 may be selectively responsive to certain tags/identifiers 38 of key 34. In other words, the controller 100 of monitor 10 may be configured to disable the fall alarm signal 102 of fall monitor 10 in response to only certain keys 34 having particular identifiers. For example, a specialized RFID tag 38 may be incorporated into a clinician's hospital badge that is configured to transmit a particular identifier to the RFID reader 36 for disabling the fall alarm signal 102 or otherwise activating a particular function of the monitor 10 based on the identifier of the specialized RFID tag. In alternate embodiments, the controller 100 of monitor 10 is configured to disable the fall alarm signal 102 in response to any key 34 with a RFID tag 38 being placed in proximity to the clinician key section 30. For example, the controller 100 may be configured to disable the fall alarm signal 102 in response to any existing RFID tag 38 that is incorporated into a clinician's hospital badge.

In preferred embodiments, the first wireless communications receiver of the clinician key section 30 is selected to include both a low power state and an increased power state in order to conserve power during normal monitoring status. For example, in preferred embodiments in which the receiver is an RFID reader 36, the RFID reader 36 includes a low power state in which the amount of RF energy emitted from the RFID reader 36 is decreased but is still otherwise capable of detecting changes to the RF field adjacent the activation surface 32 of the clinician key section 30 (i.e., a scanning mode). The lower power state would typically be the default status when the monitor 10 is powered on and the fall alarm monitoring is activated. Once a change in the RF field is determined by the RF reader 36 in its low power state, the RFID reader 36 "wakes up" to switch to its increased power state for reading the RFID tag 38 of key 34 (or the RFID tag 54 of the wireless communications module 52 described below). Similarly, in embodiments in which the clinician key section 30 operates using Bluetooth technology, the receiver may operate in a lower/sleep power state (e.g., Bluetooth low energy) until a key 34 is detected such that the receiver "wakes up" to an increased power state sufficient to transfer the necessary data from the transmitter of the key 34 to the receiver of the clinician key section 30.

In alternate embodiments, the clinician key section 30 may also include a power switch that is biased to the off position to conserve power to the receiver of the clinician key section 30. The key 34 then includes a corresponding mechanism that is configured to wirelessly activate the power switch to the receiver. For example, an RFID reader may be powered by a magnetic relay switch. The key 34 then includes a corresponding magnet to activate the RFID reader upon placing the key 34 in proximity to the clinician key section 30, which then allows the RFID reader to read the identifier of the RFID tag of the key 34. In other embodiments, the receiver of the clinician key section 30 could be configured to be passive or otherwise in a sleep mode until activated by the key 34. According to this embodiment, the key 34 is operable to transfer power to the receiver of the clinician key section 30 when the key 34 is placed in proximity to the activation surface 32.

Figure 3:
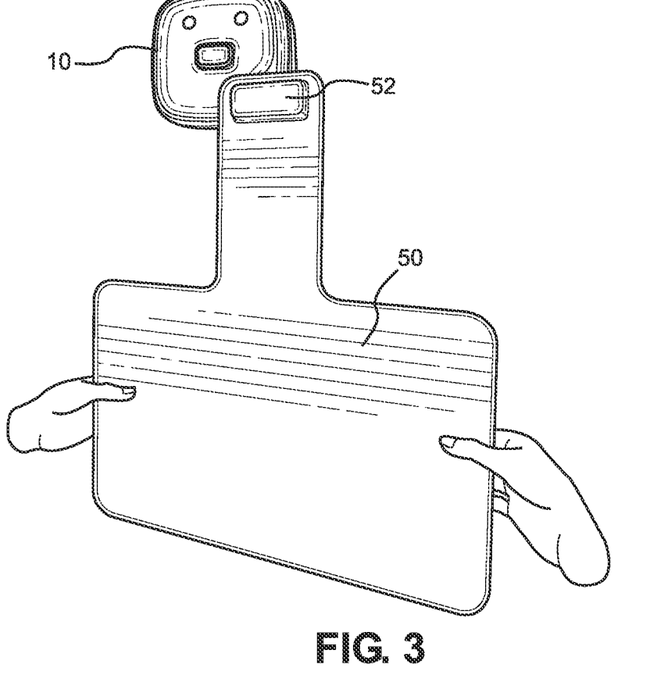
FIG. 3 depicts a front perspective view of the fall monitor of FIG. 1 with a wireless module of a fall detection pad being placed in proximity to a clinician key section of the fall monitor to pair the pad to the fall monitor according to one embodiment of the disclosure.

With reference to FIG. 3, the first wireless communications receiver 36 of the clinician key section 30 may also double as a receiver for initiating a pairing process between a wireless pad 50 and monitor 10. According to this embodiment, the wireless pad 50 includes a wireless communications module 52 for communicating wirelessly with the monitor 10. Once paired, the pad 50 and monitor 10 may be configured to communicate wirelessly according to any number of wireless communications systems including Bluetooth, Wi-Fi, Zigbee, NFC, etc. To unpair a particular pad module 52 from the monitor 10, the monitor may include an "unpair" button (such as in the rear of the device that is covered by a rear access door that may include a place for batteries, settings for the monitor to be changed, etc.).

More specifically, and with reference to the preferred embodiment of FIG. 5, the wireless communications module 52 of the pad 50 includes a first pad transmitter 54 and a second pad transmitter 56 while the monitor display unit 10 further includes a second wireless communications receiver 90. According to the embodiment shown in FIG. 5, the first pad transmitter 54 is preferably an RFID tag operable to transmit a pairing communication to the RFID reader 36 when the fall detection pad 10 and/or wireless communications module 52 is placed in proximity to the clinician key section 30 to initiate a pairing process between the pad 50 and the monitor 10. The second pad transmitter 56 and second wireless communications receiver 90 then operate under a different communications protocol (e.g., longer range Bluetooth standard) than the RFID tag 54 and RFID reader 36. In preferred embodiments, and as shown in FIG. 5, the second pad transmitter 56 includes a Bluetooth transmitter (that is preferably incorporated into a Bluetooth transceiver for bidirectional communication between the monitor 10 and pad 50) while the second wireless communications receiver 90 includes a Bluetooth receiver (and preferably incorporated into a corresponding Bluetooth transceiver). Once paired, the Bluetooth transceiver 56 of the pad 50 is operable to communicate with the Bluetooth transceiver 90 of the monitor 10 during standard operation of the fall monitor system. Standard operation of the system includes a monitoring mode in which a pressure detection circuit 58 of the pad 50 monitors for a patient removing pressure from the pad 50. When the circuit 58 is broken (i.e., the patient has removed pressure for the pad 50), the fall detection pad 50 generates a fall alarm communication that is transmitted by the Bluetooth transceiver 56 of the pad 50 to the Bluetooth transceiver 90 of the monitor 10 such that the controller 100 issues the fall alarm signal 102 (assuming the hold function has not been activated by the clinician key 34).

According to another aspect of the disclosure, a method of pairing a pad 50 to a monitor 10 and then using the monitor to detect patient movement at the pad is provided according to the following steps: (1) the wireless module 52 is connected to pad 50; (2) the pad 50 is paired to the monitor 10 by positioning wireless module 52 of pad 50 in proximity to the clinician key section 30 of the monitor 10; (3) a light 26 of the monitor 10 blinks a particular color (e.g., blue) to indicate a standby state; (4) the pad 50 is positioned as desired for the patient; (5) the patient provides weight on the pad 50 (sits or lays down on the pad) to change the pad status from the standby state to an armed state, and the blinking light 26 of the monitor 10 changes colors (e.g., green) to indicate the armed state; (6) if the patient removes their weight from the pad 50, the fall alarm signal 102 is issued by the monitor 10 and the blinking light 26 changes colors (e.g., red) to indicate an alarm state for the monitor 10; and (7) to stop the alarm and go back to the standby state, a caregiver presses a "reset" button 20 on the monitor 10 and/or the clinician key 34 is placed in proximity to the clinician key section 30.

According to certain embodiments, the same monitor 10 is preferably able to be used with a pad 50 using both a wireless connection and a wired connection. When the pad 50 is connected to the monitor 10 using a wired connection, the above method remains generally the same except a cable is connected to the pad 50 and monitor 10 instead of having to pair the wireless module 52 to the monitor 10.

Figure 4:
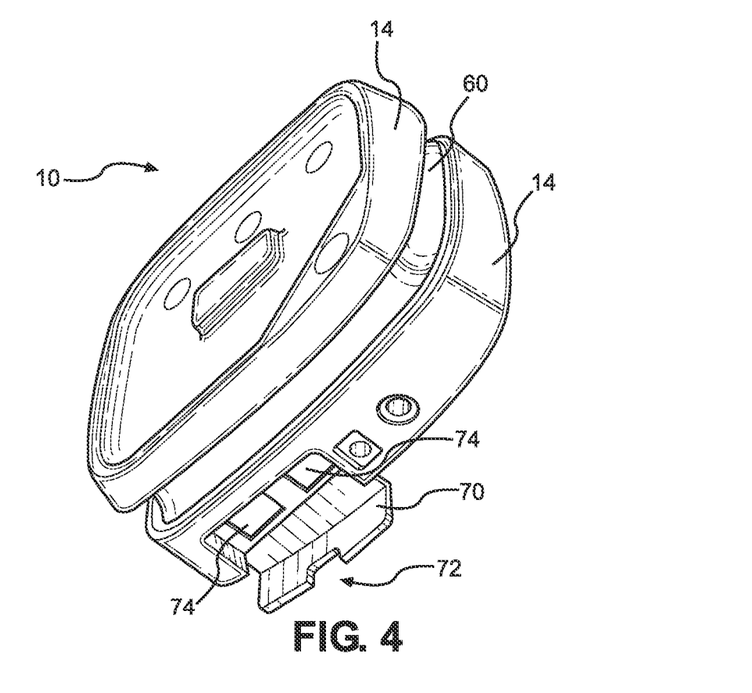
FIG. 4 depicts a bottom perspective view of the fall monitor of FIG. 1 according to one embodiment of the disclosure.

With reference to FIG. 4, monitor 10 may also include a corded retention system 60 for when a wired connection is at least desired as an option to connect the monitor 10 to a pad. As shown, the corded retention system may be in the form of a recess positioned in the sidewall 14 around the periphery of the monitor 10. The cord is then wrapped around the recess to retain the cord to the monitor 10. In another embodiment, the corded retention system could include a set of spaced apart hooks positioned on the monitor 10 (e.g., along a surface of the sidewall 14) for wrapping the cord around the hooks. In yet another embodiment, the monitor could include a cavity such that the cord can be placed in the cavity when not in use. In yet another embodiment, one end of the cord is retained within a cavity and the cord is then able to be expanded or retracted as needed from within the cavity. It should also be understood that the corded retention systems as described above could be used to both retain the cord when not in use or retract/expand the cord when in use depending on the desired length of the cord.

According to another aspect of the disclosure, wired embodiments of the present fall monitor system preferably include a reusable cable for connecting the pad to the monitor 10. In certain embodiments, the reusable cable is permanently connected to the monitor 10 at a first end and then able to be removably connected to the pad at the opposite second end. In other embodiments, the reusable cable is removably connected to both the monitor 10 at its first end using various hard-wired connection systems such as a USB or USB-C connection and the pad at its second end.

In preferred embodiments in which the reusable cable is removably connected to monitor 10, the monitor 10 includes a tamper resistant mechanism for preventing unintentional disconnections between the cable and the monitor 10. For example, the cable could include both a plug interface to make the electrical connection between the cable and the monitor 10 and then an additional screw interface for preventing unintentional disconnections between the cable and the monitor 10. According to another embodiment, and with reference again to FIG. 4, the tamper resistant mechanism is in the form of the monitor 10 including an access door 70 that is movable from an open position (shown in FIG. 4) to a closed position. The access door 70 further includes a gap portion 72. In the open position, one or more cable connection ports 74 are accessible such that the first end of the cable is able to be connected to one of the ports 74 when the access door 70 is open. The access door 70 may then be shut with the cable extending through the gap portion 72 of the access door 70. The first end of the cable (e.g., USB overmold) would then be dimensioned and configured such that it would not fit through the gap portion 72 of the access door when the access door 70 is in the closed position (i.e., the cable is unable to be disconnected from port 74 when the access door 70 is in the closed position).

The foregoing description of preferred embodiments for this disclosure have been presented for purposes of illustration and description. They are not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by any claims when interpreted in accordance with the breadth to which they are fairly, legally, and equitably entitled.

What is claimed is:

1. A fall monitor system comprising:
   a fall monitor display unit including:
      a controller configured to generate a fall alarm signal in response to a fall alarm communication,
      a first wireless communications receiver in communication with the controller,
      a second wireless communications receiver in communication with the controller and configured to receive wireless communications according to a different communications protocol than the first wireless communications receiver, and
      a clinician key section disposed adjacent the first wireless communications receiver, the first wireless communications receiver being configured to receive wireless communications from a corresponding clinician key for providing instructions to the controller to activate a particular function of the fall monitor display unit when the clinician key is placed in proximity to the clinician key section; and
   a fall detection pad configured to generate the fall alarm communication when the fall detection pad determines that a patient has removed pressure from the fall detection pad, the fall detection pad having a wireless communications module, the wireless communications module including:
      a first pad transmitter configured to communicate with the first wireless communications receiver to transmit a pairing communication when the first pad transmitter of the fall detection pad is placed in proximity to the clinician key section to pair the fall detection pad to the fall monitor display unit, and
      a second pad transmitter configured to communicate with the second wireless communications receiver when the fall detection pad is paired with the fall monitor display unit to transmit the fall alarm communication when the fall detection pad determines that a patient has removed pressure from the fall detection pad.

2. The fall monitor system of claim 1 wherein the first wireless communications receiver is an RFID reader and the corresponding clinician key includes an RFID tag such that, when the clinician key is placed in proximity of the clinician key section, the RFID tag is operable to transmit an identifier to the RFID reader to provide the instructions to the controller to activate the particular function of the fall monitor display unit.

3. The fall monitor system of claim 2 wherein the RFID tag of the clinician key is a passive RFID tag.

4. The fall monitor system of claim 2 wherein:
   the first pad transmitter of the fall detection pad includes an RFID tag that is operable to transmit a pad identifier to the RFID reader of the clinician key section,
   the second wireless communications receiver of the fall monitor display unit includes a Bluetooth receiver, and
   the second pad transmitter of the fall detection pad includes a Bluetooth transmitter for communicating with the Bluetooth receiver.

5. The fall monitor system of claim 1 wherein the particular function activated by the instructions of the clinician key includes disabling generation of the fall alarm signal for at least one of a predetermined time period and the fall monitor display unit determines that the patient has returned to the fall detection pad.

6. The fall monitor system of claim 1 wherein the first wireless communications receiver includes a low power state for conserving power while detecting for the presence of the clinician key in proximity to the clinician key section and an increased power state for communicating with the clinician key when the presence of the clinician key is detected.

7. The fall monitor system of claim 1 wherein the second wireless communications receiver is configured to receive wireless communications according to a longer range communications protocol than the first wireless communications receiver.

8. The fall monitor system of claim 1 further comprising a reusable cord configured to be connected at a first end to the fall monitor display unit and to a second fall detection pad at a second end to provide a wired connection between the fall monitor display unit and the second fall detection pad.

9. A fall monitor display unit configured to generate a fall alarm signal in response to a fall alarm communication, the fall monitor display unit comprising:
   a clinician key section having at least a first wireless communications receiver configured to:
      receive a wireless pairing communication from a first transmitter of a wireless communications module of a fall detection pad when the fall detection pad is placed in proximity to the clinician key section to pair the fall detection pad to the fall monitor display unit, and
      receive a wireless instructional communication from a clinician key to activate a particular function of the fall monitor display unit when the clinician key is placed in proximity to the clinician key section.

10. The fall monitor display unit of claim 9 wherein the first wireless communications receiver is an RFID reader configured to receive an identifier from an RFID tag of the clinician key to activate the particular function of the fall monitor display unit when the clinician key is placed in proximity of the clinician key section.

11. The fall monitor display unit of claim 10 wherein the RFID reader is configured to activate a passive RFID tag of the clinician key.

12. The fall monitor display unit of claim 9 wherein activation of the particular function of the fall monitor display unit activated by the instructions of the clinician key includes an ability to disable generation of the fall alarm signal when the clinician key is placed in proximity to the clinician key section for a predetermined time period.

13. The fall monitor display unit of claim 12 wherein the fall monitor display unit is configured to return to a monitoring status within the predetermined time period when the fall monitor display unit determines that a patient has reapplied pressure to the fall detection pad.

14. The fall monitor display unit of claim 9 wherein the first wireless communications receiver includes a low power state for conserving power while detecting for the presence of the clinician key in proximity to the clinician key section and an increased power state for communicating with the clinician key when the presence of the clinician key is detected.

15. A method for monitoring a patient for a fall, the method comprising:

providing a fall monitor display unit configured to generate a fall alarm signal in response to a fall alarm communication, the fall monitor display having a first wireless communications receiver, a clinician key section disposed adjacent the first wireless communications receiver, and a second wireless communications receiver;

providing a fall detection pad having a pressure detection circuit and a wireless communications module, the wireless communications module including a first pad transmitter configured to communicate with the first wireless communications receiver and a second pad transmitter configured to communicate with the second wireless communications receiver;

pairing the fall detection pad to the fall monitor display unit by positioning the wireless communications module in proximity to the clinician key section such that the first pad transmitter transmits a pairing communication to the first wireless communications receiver;

positioning the fall detection pad underneath a patient such that pressure from the patient completes the pressure detection circuit;

generating the fall alarm communication when the fall detection pad determines that the pressure detection circuit is broken;

transmitting the fall alarm communication from the second pad transmitter to the second wireless communications receiver of the fall monitor display unit;

generating the fall alarm signal at the fall monitor display unit upon receipt of the fall alarm communication from the fall detection pad; and activating a particular function of the fall monitor display unit when a clinician key is positioned in proximity to the clinician key section.

16. The method of claim 15 further comprising providing the clinician key having a key transmitter configured to communicate with the first wireless communications receiver to activate the particular function of the fall monitor display unit when the clinician key is placed in proximity to the clinician key section, the particular function including an ability to activate at least one of a hold and a suspend status for the fall alarm signal.

17. The fall monitor display unit of claim 9 further comprising a second wireless communications receiver configured to receive wireless communications from a second transmitter of the wireless communications module of the fall detection pad after the fall detection pad is paired to the fall monitor display unit.

18. The fall monitor display unit of claim 17 wherein the first wireless communications receiver of the fall monitor display unit is an RFID receiver and the second wireless communications receiver of the fall monitor display unit includes a Bluetooth receiver.

19. The fall monitor display unit of claim 17 wherein the second wireless communications receiver is configured to receive wireless communications according to a different protocol than the first wireless communications receiver.

20. The fall monitor display unit of claim 17 wherein the second wireless communications receiver is configured to receive wireless communications according to a longer range communications protocol than the first wireless communications receiver.

* * * * *